United States Patent [19]
Thomas et al.

[11] Patent Number: 6,016,402
[45] Date of Patent: Jan. 18, 2000

[54] METHOD FOR INTEGRATING REMOVABLE MEDIA DISK DRIVE INTO OPERATING SYSTEM RECOGNIZED AS FIXED DISK TYPE AND MODIFYING OPERATING SYSTEM TO RECOGNIZE AS FLOPPY DISK TYPE

[75] Inventors: Trent M. Thomas, Layton, Utah; John A. Hensley, Raleigh, N.C.; Troy T. Davidson, Clearfield, Utah

[73] Assignee: Iomega Corporation, Roy, Utah

[21] Appl. No.: 08/651,321

[22] Filed: May 21, 1996

[51] Int. Cl.[7] ................................. G06F 9/00; G06F 9/24
[52] U.S. Cl. .......................... 395/828; 395/652; 395/681; 395/500; 380/4; 380/25; 361/685
[58] Field of Search ..................... 395/652, 681, 395/500, 828; 380/4, 25; 361/685

[56] References Cited

U.S. PATENT DOCUMENTS

| | | | |
|---|---|---|---|
| 4,982,324 | 1/1991 | McConaughy et al. | 364/200 |
| 5,109,515 | 4/1992 | Laggis et al. | 395/725 |
| 5,418,918 | 5/1995 | Vander Kamp et al. | 395/375 |
| 5,446,877 | 8/1995 | Liu et al. | 395/180 |
| 5,452,454 | 9/1995 | Basu | 395/700 |
| 5,463,766 | 10/1995 | Schieve et al. | 395/650 |
| 5,469,573 | 11/1995 | McGill, III et al. | 395/700 |
| 5,546,585 | 8/1996 | Soga | 395/700 |
| 5,564,054 | 10/1996 | Bramnick et al. | 395/700 |
| 5,694,600 | 12/1997 | Khenson et al. | 395/652 |

OTHER PUBLICATIONS

American National Standard of Information Technology—AT Attachment Interface with Extensions (ATA–2), Jan. 17, 1995.

Microsoft Corporation, Media Status Notification Support Specification (Rev. 1.02 1996).

U.S. application No. 08/599346, Khenson et al., filed Feb. 9, 1996.

*Primary Examiner*—Thomas C. Lee
*Assistant Examiner*—Rehana Perveen
*Attorney, Agent, or Firm*—Woodcock Washburn Kurtz Mackiewicz & Norris LLP

[57] ABSTRACT

A large capacity removable media drive is integrated into a computer as a floppy disk drive. The method and apparatus are suited to an environment in which the removable media disk drive is configured as the first fixed disk drive in the computer. Thus, the removable media drive is recognized by the BIOS as a fixed disk drive. A substitute master boot record is provided to the computer from the removable media drive in response to a request for the master boot record of the media. Control of the boot sequence is thereby gained. The substitute master boot record loads a boot program that alters the operating system to recognize the removable media drive as a floppy disk drive.

18 Claims, 9 Drawing Sheets

METHOD FOR INTEGRATING REMOVABLE MEDIA DISK DRIVE INTO OPERATING SYSTEM RECOGNIZED AS FIXED DISK TYPE AND MODIFYING OPERATING SYSTEM TO RECOGNIZE AS FLOPPY DISK TYPE

FIELD OF THE INVENTION

This invention relates generally to storage subsystems for computer systems. In particular, this invention relates to removable media storage devices configured as fixed disks in computer systems and methods and apparatus for adjusting the operating system to recognize such devices as floppy disk drives.

BACKGROUND OF THE INVENTION

In recent years, personal computers (PCs), which includes work stations and the like, have grown increasingly sophisticated. During this period, the programs that run on PCs have increased in complexity and, correspondingly, in size. As a result, the capacity and usefulness of the current floppy disk drive, a standard feature in many PCs, have been surpassed by the size of the programs the floppy was designed to bear. Whereas, software developers previously distributed their products via floppy disk, they have increasingly been forced to use alternative methods, such as CD-ROM.

Despite the trend against the usefulness of the floppy disk drive, the need for the removability that the floppy disk drive provides has remained—providing diagnostic support in the event of a system failure, backing-up data files and the like. For example, if the fixed disk drive becomes corrupted, users turn to the floppy disk drive to attempt to recover. In such a case, a user boots the PC from the floppy disk drive thereby gaining entry to the PC. Once the PC is booted the user can use diagnostic tools on a floppy disk to attempt to repair the fixed disk drive; however, the limited capacity of a floppy disk poses severe constraints on the sophistication of the diagnostic tools that can be used. Larger capacity devices can overcome part of the problem, but a device that aspires to replace the floppy disk drive in a PC should also provide support for booting.

Vander Kamp et al., U.S. Pat. No. 5,418,918, suggests using a CD-ROM drive to overcome the short-comings of the floppy drive. As such, Vander Kamp teaches a method of booting a PC from a CD-ROM. Unfortunately, CD-ROMs need special BIOSes and limit the user to the tools supplied by a particular software vendor. As a result, the user is unable to mix and match preferred tools. Unlike a CD-ROM drive user, the user of a removable media drive has the capability to customize the software on the media to suit particular needs.

Recently, removable media disk drives having storage capacities characteristic of fixed disk drives and removability characteristic of floppy disk drives have been developed. Throughout this application, such drives will be referred to as "removable media drives" for brevity and to distinguish them from standard floppy disk drives. Unlike floppy disk drives, these removable media drives have the capacity to store entire operating systems and sophisticated diagnostic tools. However, to fully utilize the capacity of such a removable media drive, in the current PC environment, it must be configured as a fixed disk. This requirement has complicated the integration of removable media drives into the PC system. For example, the removable media drives must be configured as fixed disk drives, such as "C" or "D," while floppy disk drives are generally configured as "A" or "B." Unfortunately, conventional PCs only permit users to boot from the floppy "A" drive or the fixed "C" drive. However, if the removable media drive is configured as the "C" drive, conventional personal computer systems constrain the user to always have bootable media present in the drive at system start-up. Furthermore, the users ability to swap media in the removable media drive during system operation is also severely inhibited. In co-pending U.S. patent application Ser. No. 08/599,346 (now U.S. Pat. No. 5,694,600), which has been assigned to the same assignee as the present invention, method and apparatus are disclosed that provide for booting a PC from a removable media drive configured as the first fixed disk drive, i.e. drive "C".

When the removable media drive is configured as the "C" drive, the need for a floppy disk drive is diminished. For example, the removable media drive overcomes many of the floppy disk drive shortcomings by virtue of the increased capacity of the removable media. However, configuring the removable media disk drive as the "C" drive requires changes to the operating system configuration. For example, many popular programs prefer to run programs from the "C" drive. Consequently, using the removable media disk drive as a floppy drive replacement when configured as the "C" drive requires most permanent programs to reside on the "D" drive. Moreover, if the permanent programs reside on the "D" drive, while many popular programs prefer to run off of the "C" drive, program compatibility problems may arise.

In view of the foregoing, there is a need for a large capacity removable media drive that can replace the standard floppy disk drive, while leaving the conventional fixed disk drive configured as drive "C."

SUMMARY OF THE INVENTION

The present invention is particularly well suited for use in a Personal Computer System (PC) that uses the Microsoft Disk Operating System. According to an aspect of the present invention, a removable media drive is integrated into a computer system having a BIOS, wherein the BIOS supports a computer system with a first floppy disk drive attached to the computer system configured as drive "A" and a second floppy drive attached to the computer system configured as drive "B." The removable media drive and the BIOS are configured such that the BIOS recognizes the removable media drive as the drive "C." In a presently preferred embodiment, the removable media drive is integrated into the computer system during the boot sequence. Thus, the boot sequence is started causing the BIOS to request a master boot record from the drive "C." The removable media drive then transfers a substitute master boot record from the removable media drive to the processor. The substitute master boot record is executed loading the operating system and modifying it to recognize the removable media drive as drive "A".

According to an aspect of the present invention, the operating system is loaded from either the removable media drive or a fixed disk drive. In either case, while the operating system is loading, the removable media drive assignment within the operating system is changed from the drive "C" to the drive "A". When the computer system features a floppy drive configured as drive "A," according to a presently preferred embodiment, the floppy disk drive assignment within the operating system is changed from the "A" drive to the "B" drive. Additionally, when the computer system features a fixed disk drive configured as drive "D,"

according to a presently preferred embodiment, the fixed disk drive assignment within the operating system is changed from the "D" drive to the "C" drive.

In a presently preferred embodiment, the supplemental boot program is stored on either the removable media or a memory device within the removable media drive, such as a Read-Only Memory. When stored on the removable media, according to a preferred embodiment, the supplemental boot program resides on sectors in the range of 1 to 32. Although the supplemental boot program may be stored on those sectors, there is no requirement that all sectors be used.

According to a further aspect of the present invention the supplemental boot program is transferred from the removable media to the processor whether the removable media is present or not.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE INVENTION

A preferred embodiment of the invention will now be described with reference to the FIGURES. The description provided herein is for exemplary purposes only and is not intended in any way to limit the scope of the invention. For example, the computer system and operating system environment described herein are merely exemplary and are not intended to limit the invention.

The sections below describe in further detail the system for integrating a removable media drive into a PC system. There are a variety of ways that such a drive can be integrated into a PC system. Section I details an exemplary PC system having an attached removable media disk drive. Section II follows with details of a presently preferred embodiment of a removable media drive that connects to the PC system via an IDE interface. That section also provides a description of the various states of the removable media drive as a function of media insertion and removal. A user of such a PC system, may configure the removable media drive in order to facilitate booting, or merely to access the drive after the boot process has been completed. Thus, section III details a presently preferred embodiment of a method of the invention for assigning a drive letter and allowing the system to boot from the removable drive. Additionally, after the boot process is completed, the operating system cannot communicate directly with the removable drive. Extensions must be added to the operating system to enable the aspects of removability.

I. System Overview

Figure 1:
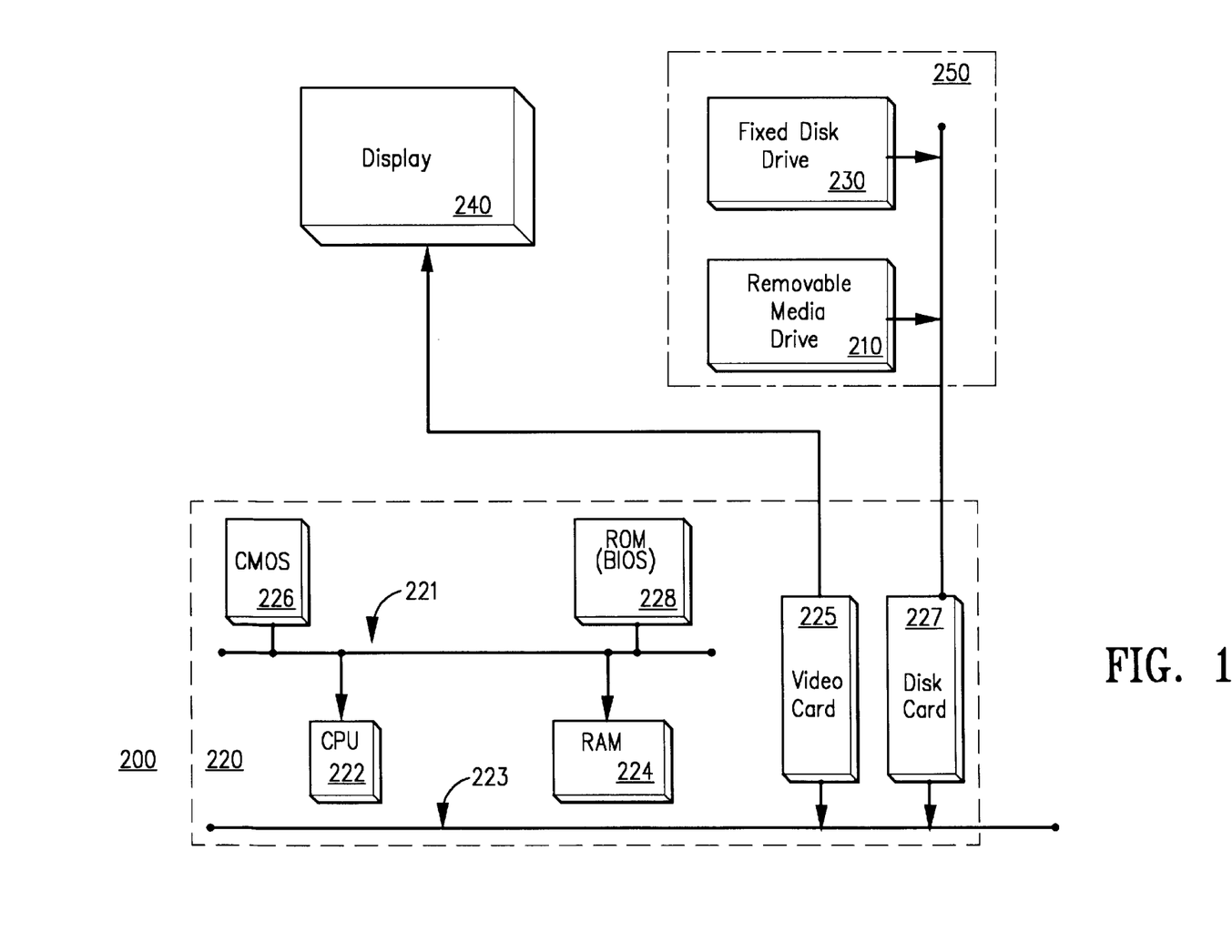
FIG. 1 is a block diagram of a conventional computer system.

FIG. 1 is a block diagram of an exemplary computer system 200, such as an IBM PC or a system functionally compatible with the IBM PC, in which the present invention may be employed. Such a system is composed of a variety of subsystems. The more significant subsystems include the processor 220, the storage device subsystem 250, and other support devices, such as the video system (e.g., a display 240), a keyboard and the like (not shown).

Each of these subsystems is, in turn, made up of a variety of components. For example, and as used herein, the processor 220 represents a subsystem that comprises a CPU 222, random access memory (RAM) 224, read-only memory (ROM) 228, CMOS memory 226, an internal bus 221 to allow communication between the CPU 222 and its components, an AT bus 223 for connecting external devices, and controller cards 225, 227 connected to the AT bus 223 for communicating with other subsystems. For example, the storage device subsystem 250 will be interfaced to the processor 220 via a disk controller card 227. Similarly, a storage device subsystem 250 may comprise a plurality of storage devices, where each storage device may be one of a fixed disk drive 230, a removable media drive 210, a floppy disk drive (not shown), a magnetic tape drive (not shown), a CD-ROM drive (not shown) or the like.

The present invention relates to the relationship of the removable media drive 210 to the processor 220. Importantly, removable media drives have attributes of both fixed disk drives and floppy disk drives. Like fixed disk drives, removable media drives have much higher storage capacities and data transfer rates than currently available floppy disk drives. On the other hand, like floppy disk drives, the drive media of the removable media disk drives can be removed and replaced during the normal operation of the PC. These and other differences between fixed disk drives and floppy disk drives have resulted in PC operating system software and Basic Input/Output System (BIOS) code treating the two types of drives differently. For example, in a conventional IBM-compatible PC employing the DOS operating system floppy drives are configured as drive "A" or "B" and are configured as 720 k to 1.44 megabytes. Fixed disks are configured as drive "C," "D" and so on and are configured with a cylinder, head and sector number that relates to the capacity of the drive. The cylinder, head and sector configuration allows capacities on the order of gigabytes. Significantly, at present, removability of fixed disk media is not fully supported by such a PC. Thus, a removable media drive cannot be simply configured as a fixed disk drive. The PC will not fully recognize its removability attributes, and problems will result.

In the storage device subsystem 250 of FIG. 1, several components in the PC 200 must interact to properly connect the processor 220 to the storage device(s) 250, particularly the removable media drive 210. Among the components are a disk controller card 227, a storage device (i.e., the removable media drive 210), a software driver residing in RAM 224, and a BIOS stored in ROM 228. Additionally, as with a fixed disk drive, when the PC 200 is configured with the removable media drive 210, settings are stored in CMOS memory 226 (an area of memory that retains its values when the power is removed from the PC) that indicates the various parameters of the removable media drive 210 to the BIOS 228. Of particular relevance, these CMOS settings contain parameters (e.g., the number of logical cylinders, heads and sectors) that are used to communicate data between the processor 220 and the removable media drive 210.

To enhance the reliability of the connection between the processor 220 and the storage subsystem 250 and to enhance the interchangability of storage devices, several standard storage device interfaces have emerged since the introduction of the PC. For example, the Small Computer System Interface (SCSI) and the Integrated Drive Electronics (IDE) interface are among the more popular standard interfaces. The presently preferred embodiment utilizes an IDE interface, although those skilled in the art should recognize that features of the present invention will work equally well on other interfaces, such as SCSI.

To ensure compatibility between controller cards and storage devices from a variety of different vendors, a storage device must conform to industry standards. In the case of IDE, those standards are documented in the proposed American National Standard on Information Technology—AT Attachment Interface With Extensions (ATA-2), Jan. 17, 1995, which is hereby incorporated by reference.

II. The Removable Media Drive and the IDE Interface

Figure 1A:
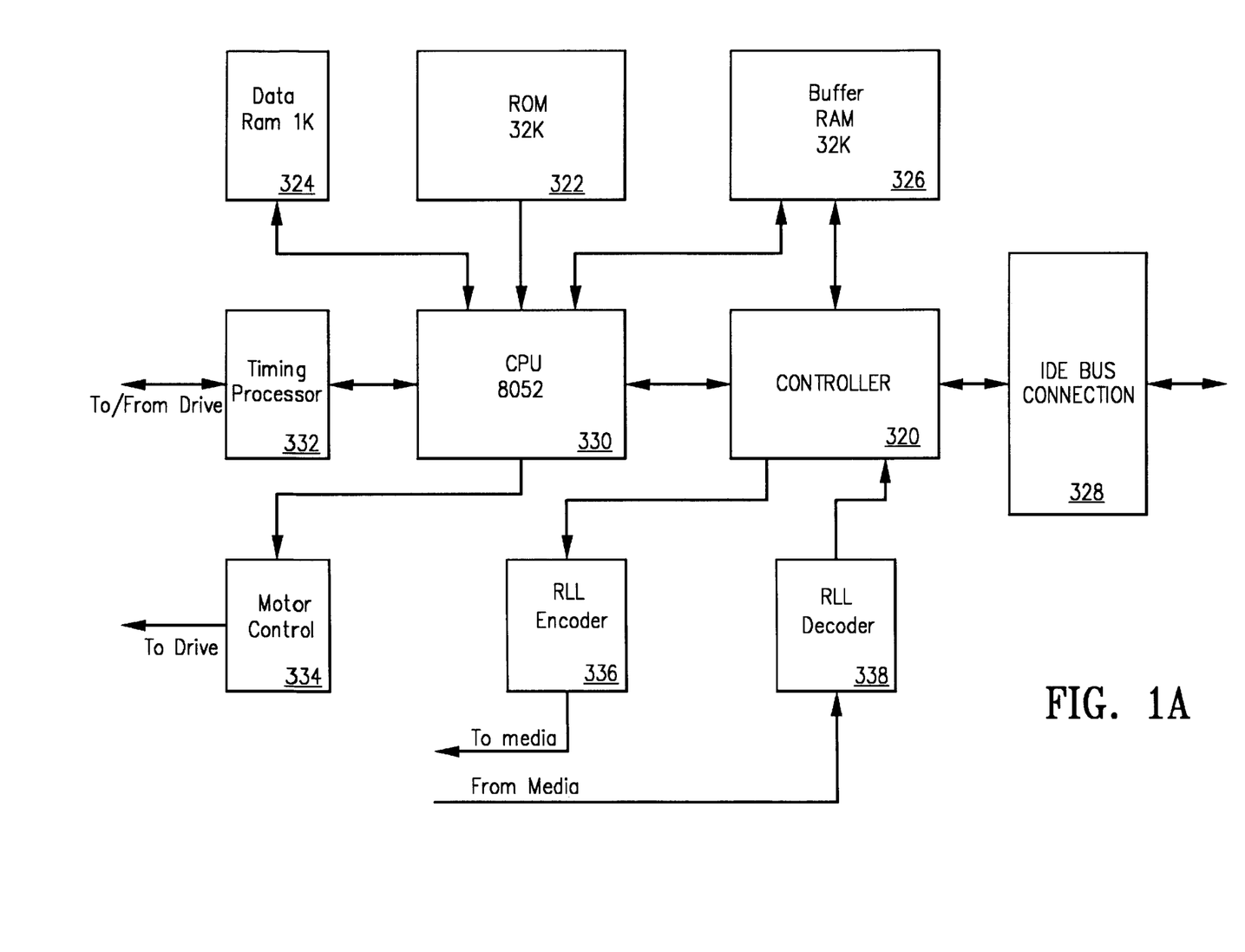
FIG. 1A is a block diagram of removable media drive controller hardware in accordance with a preferred embodiment of the present invention.

FIG. 1A presents a functional block diagram of the removable media drive 210 of the present invention as implemented for an IDE interface 227 to the processor 220. The drive electronics are comprised of several subcomponents: a 40 pin IDE bus connection 328; a CPU 330, for example, an 8052; a 1 k Data RAM memory 324 for executing local programs; a 32 k ROM memory 322 for storage of programs; a controller circuit 320, such as an AIC-7166 manufactured by Adaptec, which controls buffer management of data to and from the media, media interface, and processor interface via the IDE bus; a Timing Processor for providing timing signals to the servo motors and the read/write channel; motor control circuitry 334; an RLL encoder 336 for writing data to the media; and an RLL decoder for reading data from the media.

The removable media device is capable of communicating with the IDE controller card 227 (FIG. 1) via cylinder, head, and sector mode (hereinafter CHS mode) or logical block address mode (hereinafter LBA mode). In CHS mode, the controller card 227 presents a logical cylinder, head and sector from which data on the media is desired. The drive translates this information to a physical cylinder, head and sector to retrieve the data from the media. Importantly, the cylinder head and sector information set into CMOS 226 on the processor 220 defines the logical number of cylinders, heads and sectors on the drive and defines the translation used by the drive to determine where to physically retrieve the data on the media. In LBA mode, the controller card 227 communicates with the drive 210 through a linear mapping of sectors, starting at sector 0 and continuing to the last sector depending on the capacity of the drive.

Figure 1B:
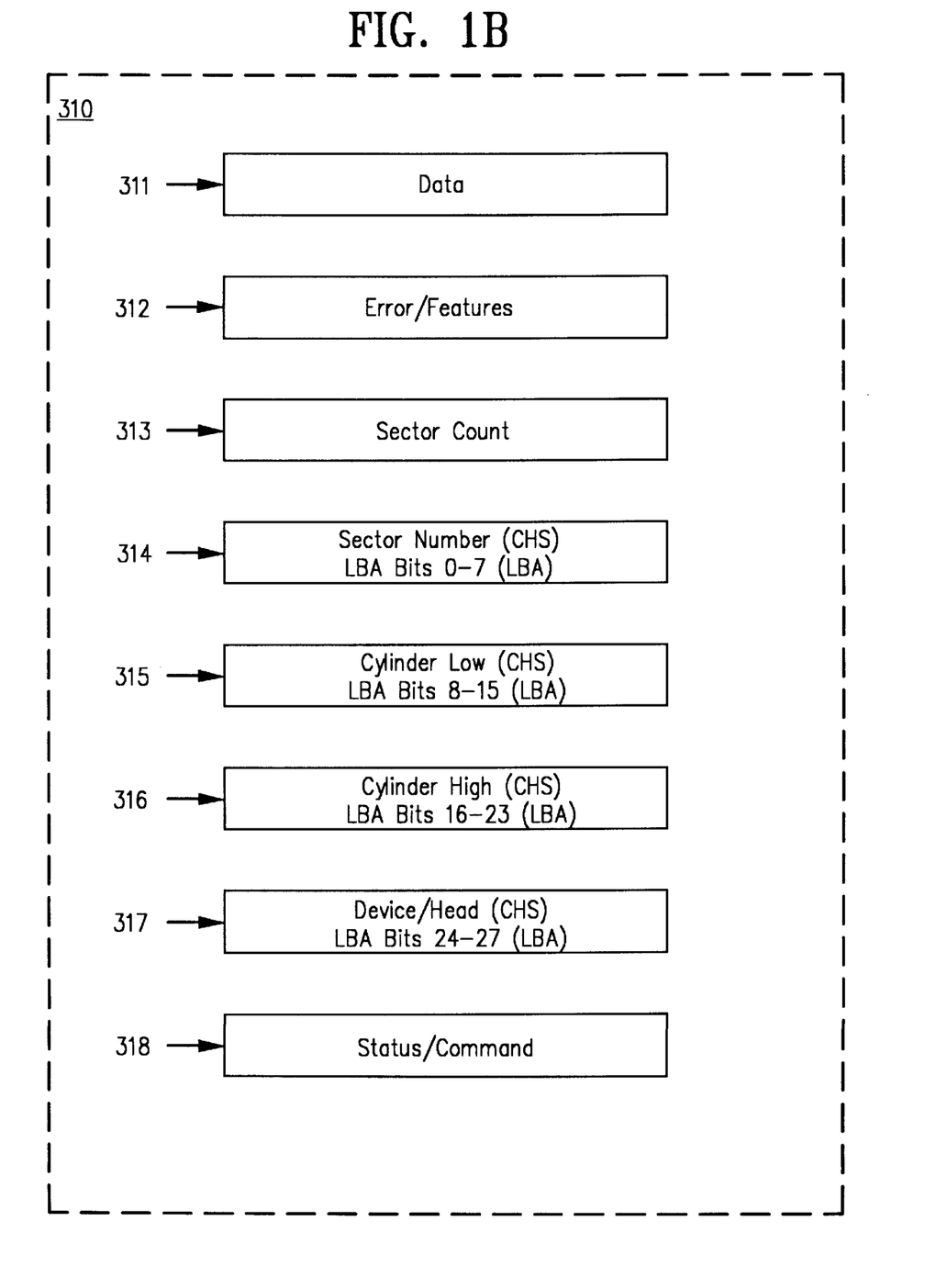
FIG. 1B is a graphical depiction of the command block registers specified in an IDE interface.

FIG. 1B is a graphical depiction of the command block registers used in an IDE interface for communication between the processor 220 and the removable media drive 210. This set of registers resides within the controller 320 on the drive electronics. The command block registers 310 comprise eight registers: the data register 311 for reading and writing data to the media; the error/features register 312, which may contain the status of the last command executed by the drive or may be used to enable or disable features of the drive; the sector count register 313, which contains the number of sectors of data to be transferred on a read or write operation; the sector number register 314 which contains the starting sector number for media access in CHS mode and bits 0–7 of the LBA when operating in LBA mode; the cylinder low register which contains the low order bits of the starting cylinder address for media access and bits 8–18 of the LBA when operating in LBA mode; the cylinder high register which contains the high order bits of the starting cylinder address for media access and bits 16–23 of the LBA when operating in LBA mode; the device/head register which contains both device and sector addressing information—bit 6 is set to zero for CHS mode; and one for LBA mode—whenever bit 4 selects the device, and bits 3 through 0 comprise the head address in CHS mode or bits 24–27 of the LEA in LBA mode; the status/command register 318 which contains the status of the drive on reads and is used to issue commands to the drive on writes. These registers are all defined in the ATA-2 specification and are used in the present embodiment according to that specification.

When the processor 220 wants to communicate with the removable media drive 210, commands are sent to the command register 318. For example, to read a block of data from the drive, the starting sector address will be loaded in to the cylinder, head and sector registers 314–317, and a sector count will be loaded into the sector count register 313. To load the registers, register information will be transferred to the drive 210 via the disk controller card 227. The register information will be sent over the IDE bus connection 328 to the controller 320. The controller will load the registers with the data provided. The controller 320, in conjunction with the CPU 330 will issue the proper commands to control the read process. In particular, the instructions to move the heads to the proper location on the media will be issued by the CPU 330 to the motor control 334 and the timing processor 332. The data provided will be decoded via the RLL decoder 338 and transferred to the buffer RAM 326, while the controller 320 passes the information back to the processor 220 through data register 311. A similar process occurs on a write to the media.

III. Removable Media Drive Integration

Figure 2:
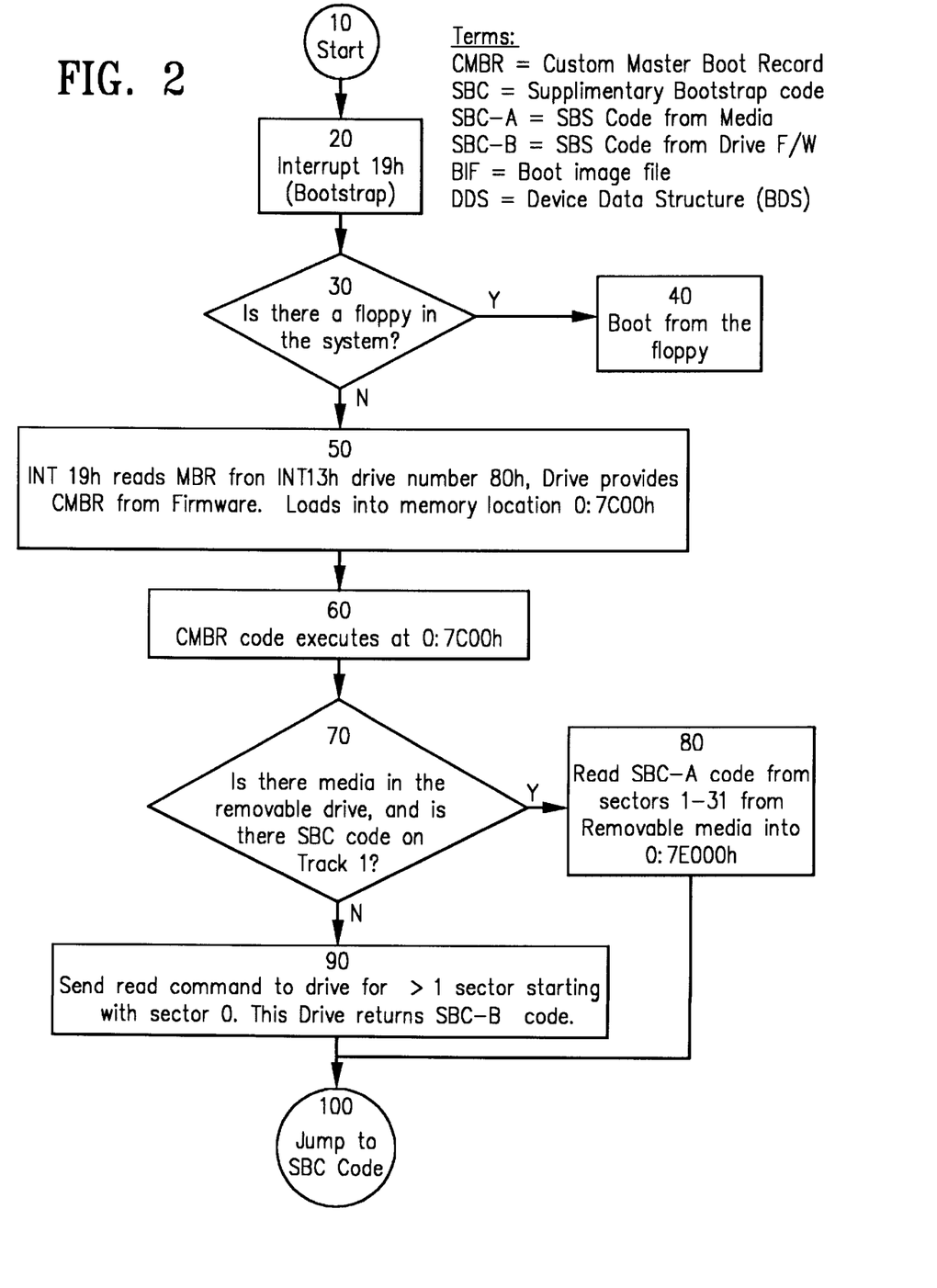
FIG. 2 is a flow chart of the present invention as it is invoked during an operating system booting sequence.
Figure 2A:
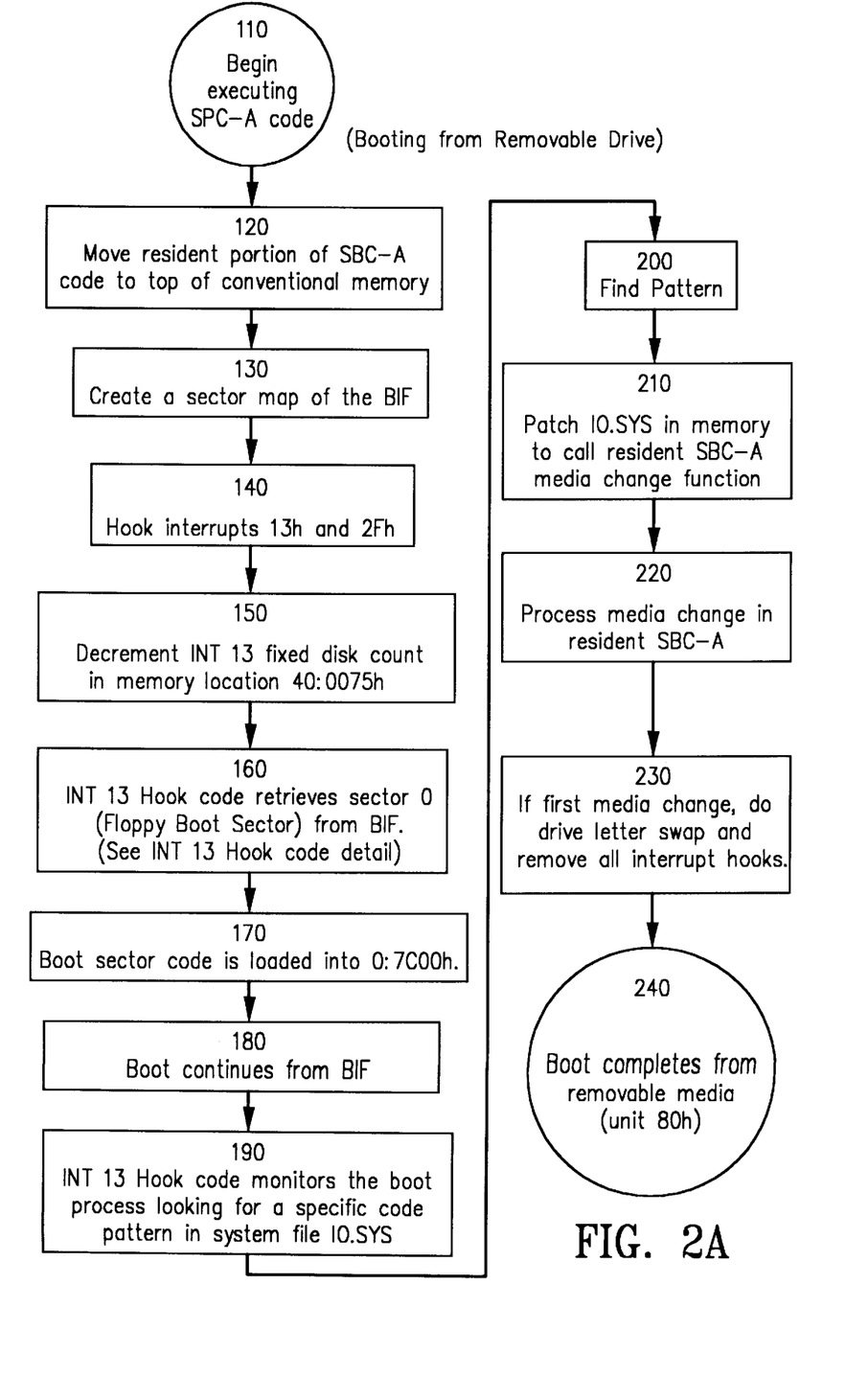
FIG. 2A is a flow chart of the process of the substitute master boot record gaining control of the boot sequence, in accordance with the present invention.

FIG. 2 shows a flow chart of a partial PC boot sequence in accordance with the methods of the present invention. According to aspects of the present invention and as will be described in further detail below, the removable media drive attempts to commandeer the boot process and reconfigure the system to provide the functionality required to make full use of the removable media drive. Whereas, conventional BIOSes support floppy drives with maximum capacities of 1.44 Mbytes, the removable media drive of the present invention provides capacities on the order of 100 Mbytes. Moreover, although conventional BIOSes only provide support for up to a 1.44 Mbyte floppy drives, operating systems such as MS-DOS and Windows do not have any inherent capacity limitations on the size of the floppy drives. Thus, according to a presently preferred embodiment of the present invention, a removable media drive, initially configured and recognized by the BIOS as a fixed disk drive "C," becomes floppy drive "A" during the boot sequence.

The system starts and goes through routine system testing, e.g., power-on self test (step 10). After successful completion of those testing procedures, the BIOS attempts to load the operating system from a storage device by invoking INT 19h (step 20). During the boot sequence (alternately referred to herein as "booting"), the INT 19h routine looks for a bootable disk beginning at INT 13 unit 0, (the traditional system floppy drive "A"). If a bootable floppy disk is found in the floppy drive (step 30), booting proceeds normally from the floppy (i.e., aspects of the present invention are not invoked). On the other hand, if no bootable floppy is contained within the floppy disk drive, INT 19h attempts to read the master boot record from the device specified at INT 13 unit 80h, which is, conventionally, fixed disk "C." However, in a presently preferred embodiment of the present invention, the removable media drive, parading as a fixed disk, resides at this location. Thus, booting proceeds from the removable media drive.

When the BIOS (via INT 19) attempts to retrieve the master boot record (MBR) from the media, a substitute master boot record is provided in its stead. In response to a request for sector 0, the removable media drive provides a substitute master boot record (referred to herein as a custom master boot record (CMBR)) from memory (step 50). According to a presently preferred embodiment, the custom master boot record is stored in a ROM on the removable media drive. Additionally, the CMBR conforms to all superficial requirements of an MBR, such as formatting requirements, size and the like, so that the BIOS, believing the CMBR is authentic, passes control to it.

The BIOS thus executes the CMBR (step 60). Conventionally, an MBR would load a boot sector from the same device from which the MBR was loaded, and the boot sector code would then load the operating system. By contrast, the CMBR of the present invention does not immediately load boot sector code. Indeed, according to an aspect of the present invention, the removable media drive may have no media present from which to load a boot sector. Thus, two CMBR paths are possible: one with removable media present, and one without removable media present. The CMBR determines whether or not media is present in the removable media drive (step 70). The CMBR in conjunction with the removable media drive makes the determination of media presence in accordance with the specification detailed in the Microsoft Corporation, Media Status Notification Support Specification (Rev. 1.02 1996), which is hereby incorporated by reference.

If removable media is present, then the CMBR requests supplemental boot code (SBC) from sectors 1–31 on the media (step 80), referred to herein as SBC-A to indicate that it loaded from the media. Conventionally, these sectors are unused by the PC system. By storing the SBC at this location, the removable media boot code can be modified and upgraded easily. After the SBC-A is loaded and executed, booting proceeds from the removable media drive as described in detail below.

If on the other hand, no removable media is present, the SBC is provided from removable media drive memory (step 90), e.g., ROM, and is referred to herein as SBC-B to indicate that it loaded from the drive memory. The CMBR makes a request for the code beginning at sector 0 and request more than one sector to retrieve the SBC-B. The removable media drive interprets this as a request for SBC-B stored in memory. A request for multiple sectors beginning at sector zero can safely be interpreted as a request specific to the removable media drive because, as indicated above, sector 0 conventionally contains the MBR; however that MBR is only one sector long. After the SBC-B program is loaded and executed, booting proceeds from the fixed disk drive as described in detail below.

After either SBC program is loaded, the CMBR passes control to that SBC (step 100). The function of each SBC (A and B) is described more fully below.

A. SBC-A Path—Booting From the Removable Media Drive

The SBC-A code is comprised of two main segments. The first segment remains resident in the PC after the boot process completes, providing removability support for the removable media drive in the absence of a driver. The second segment, which is no longer useful after the boot process completes, releases its memory locations to the system after booting completes.

Figure 2B:
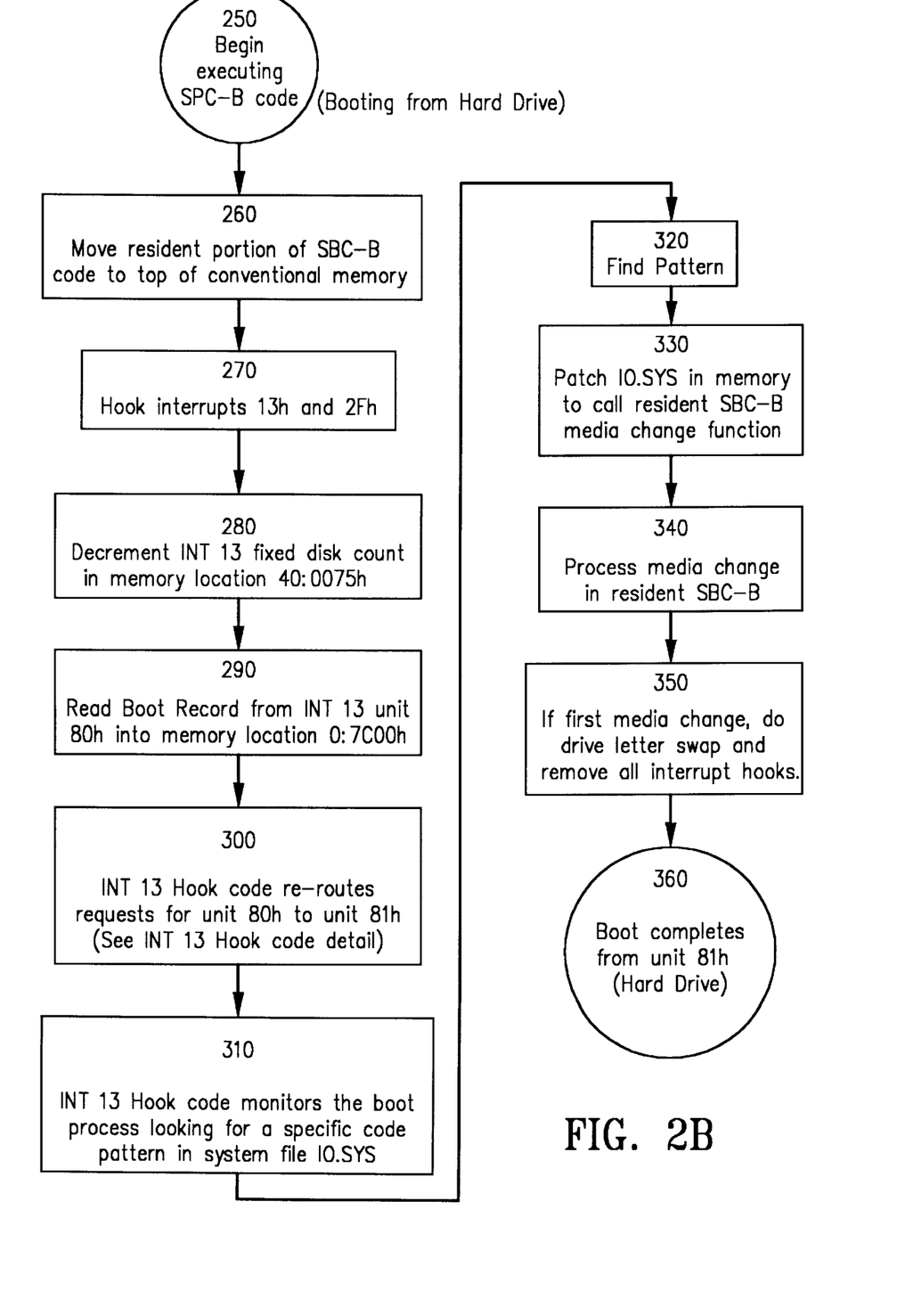
FIG. 2B is a flow chart of the process of the supplemental boot code completing the boot sequence from the removable media drive, in accordance with the present invention.

Referring to FIG. 2B, the SBC-A first moves the resident segment of itself to the top of memory (step 120). A sector map is created to determine the location of a Boot Image File (BIF) (step 130). Currently, the BIF is a 720K floppy image; however, those skilled in the art should appreciate that any format could be used to accomplish a similar purpose because the SBC-A maps it. The SBC-A then hooks interrupts 13h (INT 13) and 2fh (INT 2f) (step 140). After the interrupt hooks are set, the fixed disk count is decremented in the BIOS data area (i.e., 40:0075h) in order to temporarily hide the removable media drive from the system (step 150). The details of the function of the interrupt routine is provided below. In general when awakened, the INT 13 routine retrieves sector 0 from the BIF and loads it into memory at location 0:7C00h (steps 160 and 170). The boot process continues from the BIF (step 180). The BIF begins to load the operating system according to a conventional loading sequence, for example IO.SYS is loaded. While that operating system load sequence continues, the INT 13 routine monitors the loading of IO.SYS searching for a predetermined pattern (steps 190 and 200). When the pattern is found, a patch is inserted that handles the media change capabilities of the removable media drive (step 210). This patch remains in IO.SYS until the system is shut down and process all media change request to the removable media drive.

When the initial call to the media change code is processed the drive letter is swapped in the operating system. As will be described in further detail below, when the swap is made: the removable media drive becomes floppy drive "A"; if present, floppy drive "A" becomes floppy drive "B"; and, if present, fixed drive "D" becomes fixed drive "C" (step 220 and 230). After the swap is performed all SBC-A installed interrupt hooks are removed from the system (step 230). The boot process then completes from the removable media drive (step 240).

B. SBC-B Path—Booting From the Fixed Disk Drive

The essential difference between the SBC-B and the SBC-A described above is that the boot process will proceed from the fixed disk. Thus, as is described more fully below, the SBC-B merely attempts to provide removability support before booting from the fixed disk.

Figure 2C:
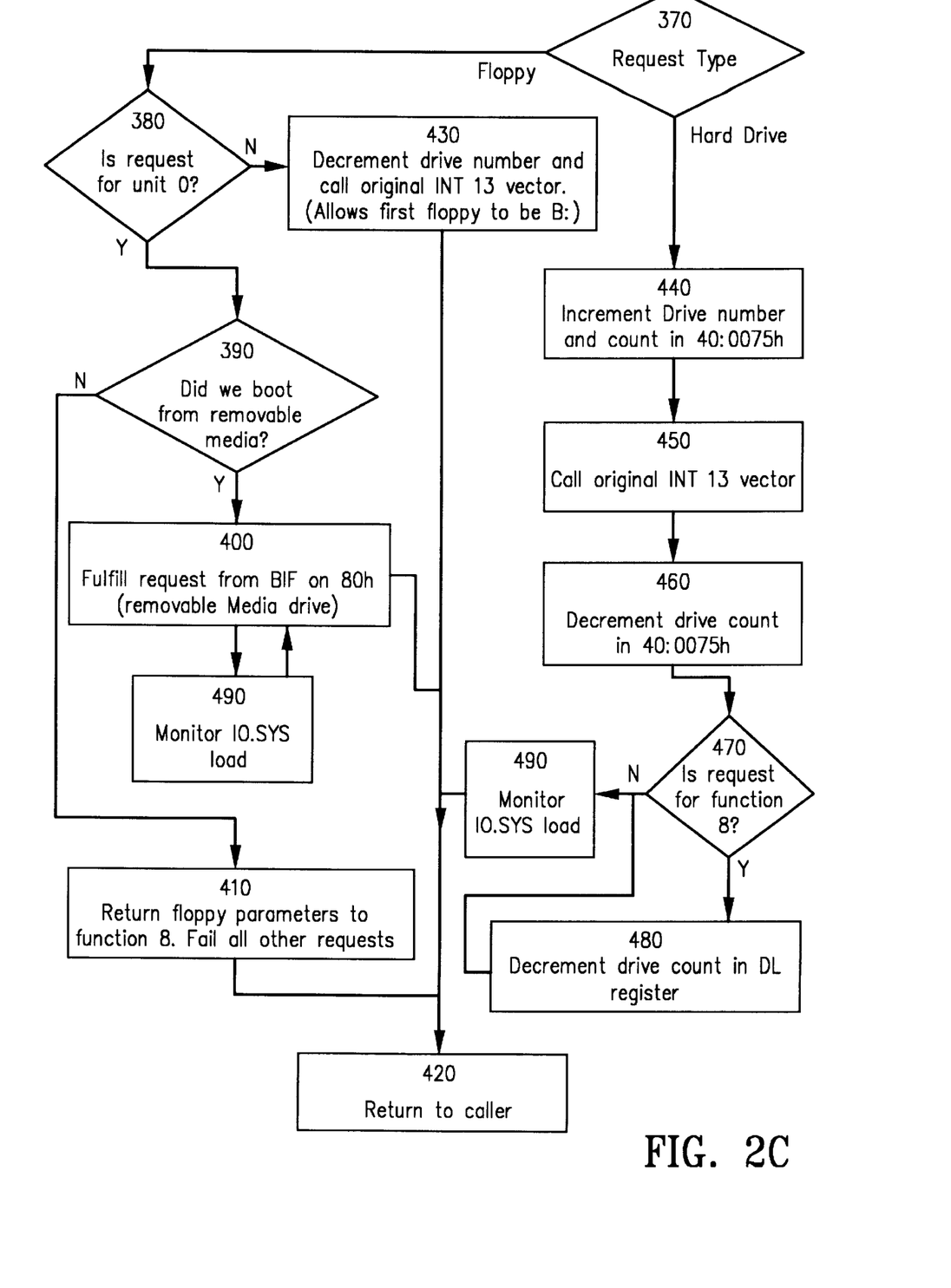
FIG. 2C is a flow chart of the process of the supplemental boot code completing the boot sequence from the fixed disk drive, in accordance with the present invention.

Referring to FIG. 2C, the boot sequence as it proceeds from the fixed disk drive is depicted. As with the SBC-A, the SBC-B is divided into two segments: a resident segment and a temporary segment. The resident segment remains after the boot process has completed and provides removability support to the removable media drive in the absence of a driver installed from the config.sys or autoexec.bat files during system booting. As such, the resident segment of the SBC-B is moved to the top of conventional memory before resuming the boot sequence (step 260).

The SBC-B hooks interrupts 13*h* and 2F*h* so that it awakens when calls are made to a drive (step 270). The fixed disk count in memory location 40:0075h is decremented to hide the removable media drive from the system (step 280). The INT 13 hook routes all requests for unit 80*h* (drive "C," i.e. the removable media drive) to unit 81*h* (drive "D," i.e. the fixed disk) (step 300). Additionally, the INT 13 hook monitors the loading of IO.SYS for a predetermined code pattern (step 210). When the pattern is found (step 320), the system has sufficiently loaded such that the IO.SYS can be patched to provide removability support from the removable media drive. Thus, when the correct instructions have been loaded, a patch is inserted that calls the media change function in the resident portion of SBC-B when media change requests are made to IO.SYS (step 330). When the first call is made to the media change portion of the SBC-B, the drive letters are swapped as described for SBC-A and all interrupt hooks are removed from the system (step 350). The boot sequence then continues from the fixed disk drive (step 360).

C. Interrupt 13 Hook

As described above, during the boot sequence, the SBC programs (A or B) set an interrupt hook on 13*h*. Thus each time a call is made to INT 13, the SBC interrupt routine is awakened to handle the call and make appropriate adjustments to account for the removable media drive and the non-standard boot sequence. To that end, the interrupt handler first determines the destination drive of the request. Based on the drive the interrupt routine will handle the request differently. Additionally, each time the interrupt handler is called to read from a drive, the IO.SYS load status will be checked and IO.SYS patched accordingly.

Referring to FIG. 2C, when an INT 13 is requested, the call is intercepted by the hook routine of the present invention. First the routine determines whether the request is for a floppy or fixed disk drive (step 370). If a request is for floppy drive access, the routine determines whether the request is for unit 0 (i.e., floppy "A") or not (i.e., floppy "B") (step 380). In the first case, in which a call is made to floppy disk drive "A," the request will be handled differently based on whether the boot is proceeding from the removable media drive or from the fixed disk drive (step 390). If the boot is proceeding from the removable media drive, the request is fulfilled from the BIF on the removable media drive (step 400). On the other hand, if the boot is proceeding from the fixed disk drive, the code returns the correct floppy parameters for a Get Drive Parameters command. All other requests fail (step 410).

In the second case, in which a call is made to floppy disk "B," the drive number in the request packet is decremented, and the original INT 13 handler is called (step 430). A floppy drive can then be accessed as drive "B," if one is installed in the system.

In the last case, in which the call is made to the fixed disk drive, the drive number in the request packet and the fixed disk count number in the BIOS data area (location 40:0075h) are both incremented (step 440). This allows the request to be properly routed to the fixed disk drive. The request is then passed to the original INT 13 handler for processing (450). After the original INT 13 has finished processing, the drive number and drive count are decremented once again (step 460). If the request was a Get Drive Parameters command, the drive count in the DL register is decremented to hide the removable media drive from the system before returning to the caller (step 470 and 480).

During this INT 13 request, the progress of the IO.SYS load is checked. Essentially, if the request was made to the floppy drive, the IO.SYS is not monitored. On the other hand, if the request was made to the fixed disk or the removable media drive, the IO.SYS load progress is checked (step 490). The details of the IO.SYS load are given below.

In all cases, after the request is processed, control is returned to the caller.

D. Monitoring the Loading of IO.SYS

As stated above, the loading of IO.SYS is monitored by the INT 13 hook routine. Importantly, the operating system must be patched to support the removable media drive. The patching must occur at a precise point in the operating system load process. If done too early, the operating system will overwrite the patch. If done too late, the drive will not function properly, potentially destabilizing the system.

According to the presently preferred embodiment of the present invention, the system is stable after a read from the boot disk that loads a particular portion of IO.SYS. Consequently, each time a call is made to the INT 13, and the call is a read request, the data read is scanned. The patch is made when the data read matches the following pattern:

TEST BYTE PTR ES: [DI+24], 01

JZ $+18

AND WORD PTR ES: [DI+23], FEFFh

The first line of the data read is the code that tests for unformatted media. This code must be changed to handle the removable media drive. When found, the code is patched with a far call to the resident portion of the SBC that handles the Media Change functions. After the patch, the code has the following pattern:

CALL FAR MEDIA_CHANGE

JZ $+18

AND WORD PTR ES: [DI+23], FEFFh

With the patch in place, the INT 13 routine completes its function and returns to the caller.

Figure 2D:
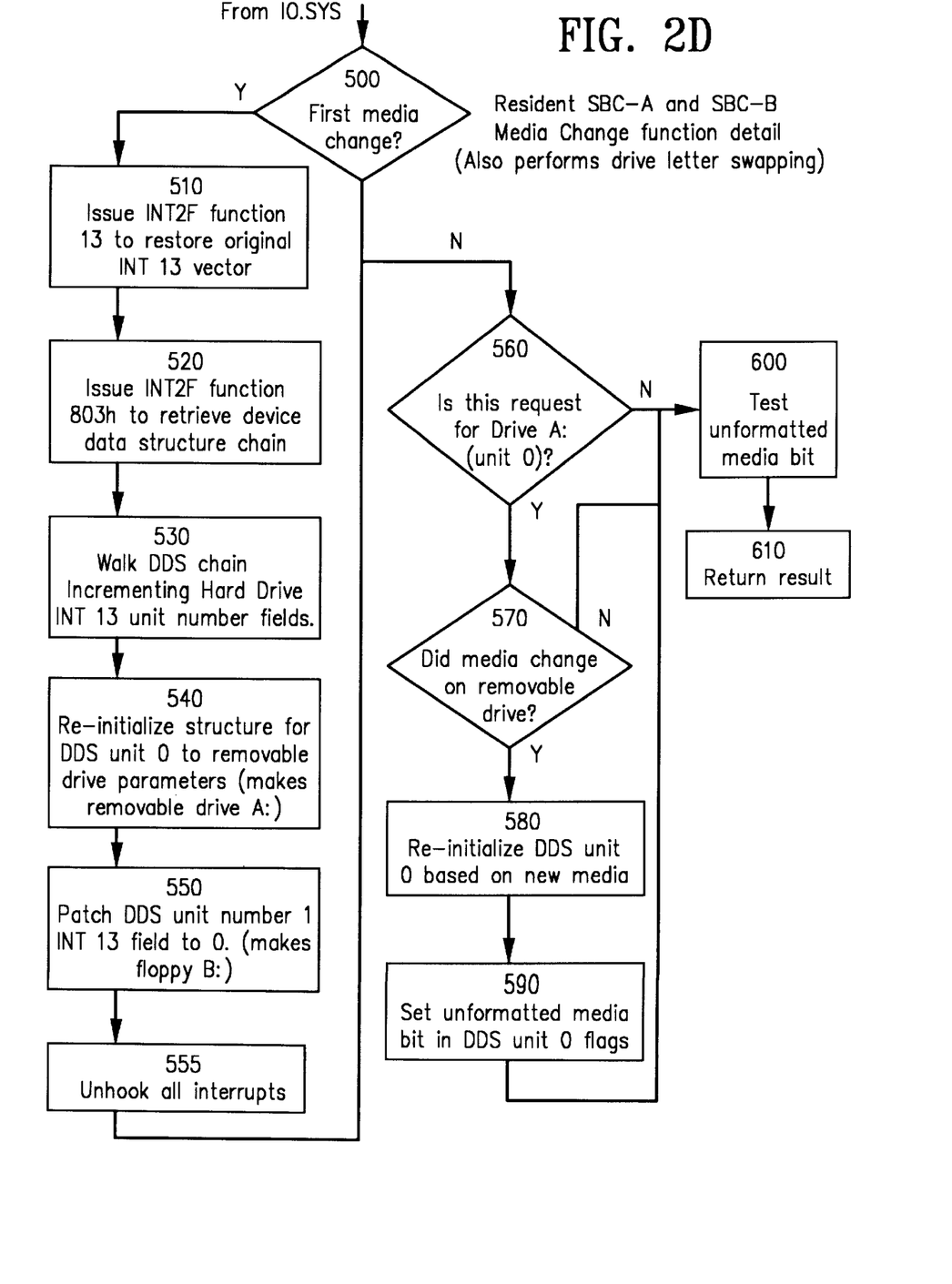
FIG. 2D is a flow chart of the process of the resident portion of the supplemental boot code that handles media change requests; and, FIG. 2E is a flow chart of the IO.SYS monitoring process whereby the operating system loading is monitored and the operating system patched at the appropriate time.
Figure 2E:
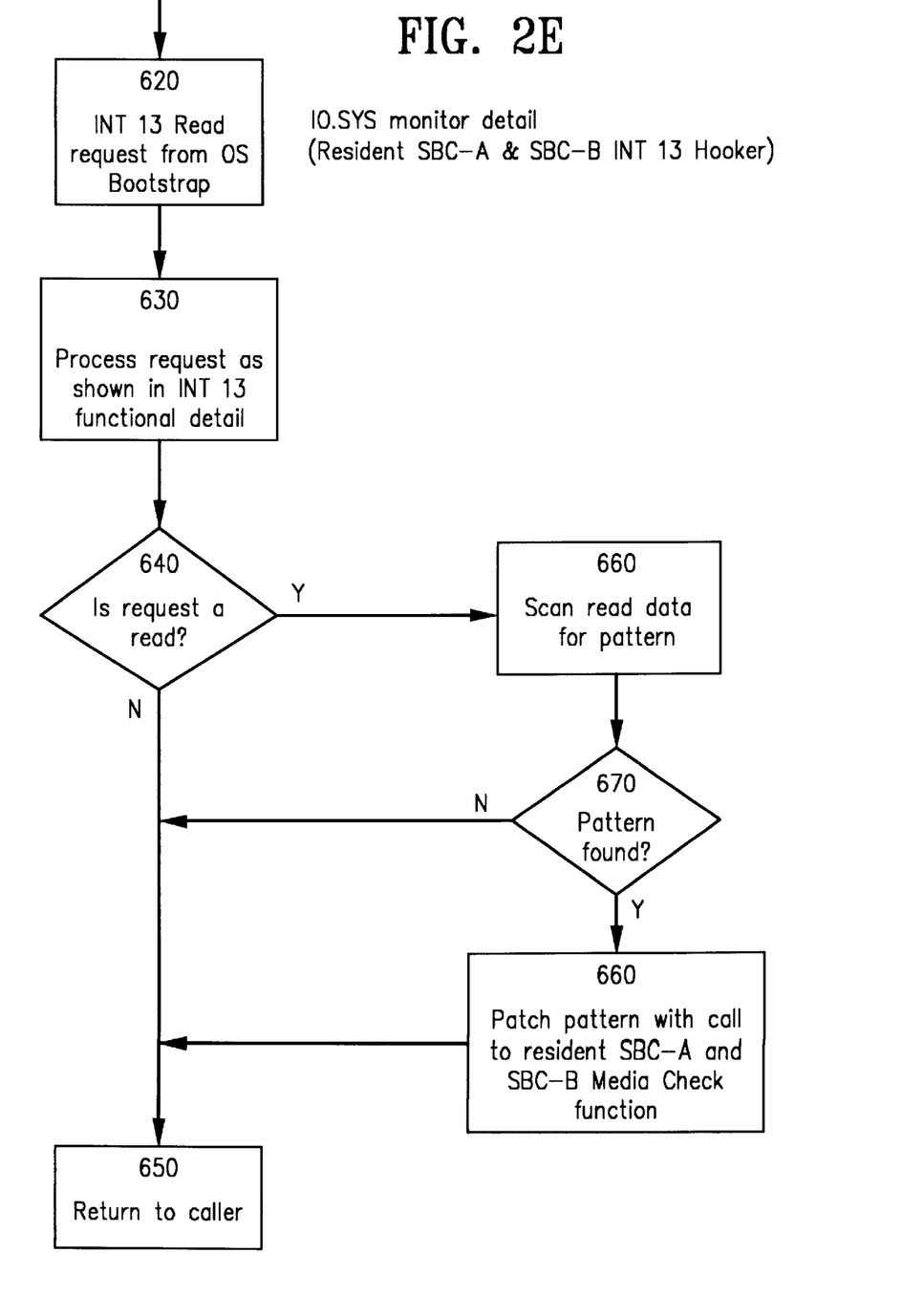

Referring to FIG. 2E, the flow of the IO.SYS monitor is illustrated. Initially, an INT 13 read request is made by the operating system boot sequence (step 620). The request is processed as described in detail above with respect to FIG. 2C (step 630). When the IO.SYS monitor is called, it determines if the INT 13 request was a read (step 64). If not, there is nothing to monitor (step 650). Otherwise, a test is made for the pattern described above (step 660). If the pattern is found, the patch is made (step 680).

E. Resident Segment of SBC

After the PC has completed booting, a segment of the SBC routine remains resident in memory to provide support for the removable media drive. This segment of the SBC gets called each time a call is made to the patched IO.SYS. On the first call to this segment of SBC, drive letter swapping is performed. Thereafter, this SBC segment checks the removable media drive for a media change and makes adjustments so that the operating system recognizes the new media.

Drive swapping is performed to change the removable media drive from fixed drive "C" to floppy drive "A." In the process, other fixed and floppy drives in the system must be changed as well. If the system has another floppy configured as drive "A," then that floppy is changed to floppy drive "B." If the system has another fixed disk drive configured as drive "D," that drive is changed to fixed drive "C." As a result, the removable media drive appears as floppy drive "A" without the capacity constraints that are normally imposed on floppy drives (i.e., maximum of 1.44 Mbytes). The user appears to have a floppy drive with the expanded capacity of the removable media drive (e.g., 100 Mbytes). Additionally, all configuration files, users programs, paths and the like can remain on the fixed drive as "C."

Referring to FIG. 2D, the process flow of the resident portion of the SBC is presented. Initially, the IO.SYS code was patched to call the resident portion of SBC each time the IO.SYS services are used. Once invoked, the resident SBC determines if this is the first time it was executed (step 500). If so, the original INT 13 vector is restored, i.e., the INT 13 hook routine is removed, via an INT 2F function 13 call (step 510). Then, the device data structure chain is retrieved via an INT 2F function 803$h$ call (step 520). The DDS chain is traversed, incrementing the fixed disk drive INT 13 unit number fields (step 530). The structure for DDS unit 0 is re-initialized to reflect the removable drive parameters (i.e., the removable drive is made drive "A") (step 540). The original floppy drive, if there was one, is changed to drive "B" by patching DDS unit number 1 INT 13 field to 0 (step 550). Finally, all interrupts are unhooked and the drive swap is complete (step 555).

After the drive swap, or if this was not the first execution of the resident SBC code, the media change must be tested and corrected. First, the request is checked to see if it was intended for drive "A" (unit 0) (step 560). If the request was for drive "A," the removable drive is checked for a media change condition (step 570). If the media has changed, the DDS of the removable media drive (unit 0) is re-initialized based on the new media (step 580). Then, the unformatted media bit is set in the DDS for unit 0 so that the operating system re-reads the directory information (step 590). Next we test the unformatted media bit to provide the functionality of IO.SYS that was replaced by the patch to IO.SYS.

As the foregoing illustrates, the present invention is directed to methods and apparatus for booting a computer system and loading drivers from a removable media disk drive. In a PC system that boots an operating system from a storage device, the present invention provides a means for booting from a removable media drive. It is understood, however, that changes may be made to the embodiments described above without departing from the broad inventive concepts thereof. For example, while the method of the present invention is particularly well suited to an IDE interfaced removable media drive, the same method may be used to boot a PC system from a removable media drive connected to a different interface, such as SCSI. Accordingly, this invention is not limited to the particular embodiments disclosed, but is intended to cover all modifications that are within the scope and spirit of the invention as defined by the appended claims.

What is claimed is:

1. In a computer system comprising a processor, a removable media drive and a BIOS, wherein the BIOS supports a computer system wherein a first floppy disk drive attached to the computer system is configured as drive "A" and second floppy drive attached to the computer system is configured as drive "B," wherein a first fixed disk drive attached to the computer system is configured as drive "C" and a second fixed disk drive attached to the computer system is configured as drive "D," and wherein the BIOS boots an operating system from one of drive "A" and drive "C" into the processor, a method of adapting the computer system so that the operating system recognizes the removable media drive as the drive "A," comprising the steps of:

(a) configuring the removable media drive and the BIOS such that the BIOS recognizes the removable media drive as the drive "C";

(b) starting a boot sequence in which the BIOS requests a master boot record from the drive "C";

(c) transferring a substitute master boot record from the removable media drive to the processor; and, (d) executing said substitute master boot record such that the operating system is loaded and is modified to recognize the removable media drive as drive "A"
   (i) loading the operating system from one of the removable media drive and another fixed disk drive;
   (ii) changing the removable media drive assignment within the operating system from the drive "C" to the drive "A".

2. The method according to claims 1, wherein the computer system further comprises a floppy disk configured as drive "A," comprising the further steps of changing the floppy disk drive assignment within the operating system from the "A" drive to the "B" drive.

3. The method according to claim 1, wherein the computer system further comprises a fixed disk drive configured as drive "D," comprising the further steps of changing the fixed disk drive assignment within the operating system from the "D" drive to the "C" drive.

4. The method according to claim 1, comprising the further step of loading a supplemental boot program from the removable media drive, wherein said supplemental boot program performs the steps (i) and (ii) of loading and adjusting the operating system.

5. The method according to claim 4, wherein the supplemental boot program is stored on at least one of the removable media and a memory device within the removable media drive.

6. The method according to claim 5, wherein the supplemental boot program is transferred from the removable media to the processor when the removable media is present.

7. The method according to claim 5, wherein the supplemental boot program is transferred from the memory device to the processor when the removable media is not present.

8. The method according to claim 5, wherein the supplemental boot program stored on the removable media is stored on sectors in the range of 1 to 32.

9. The method according to claim 5, wherein the memory device comprises a Read-Only Memory device.

10. In a computer system comprising a BIOS for booting an operating system into the computer system and a removable media disk drive, wherein the BIOS and the operating system only recognize disk drives of one of a floppy disk type and a fixed disk type, a method of integrating the removable media drive into the operating system as one of the floppy disk type, comprising the steps of:

a) configuring the removable media drive, wherein the BIOS recognizes the removable media drive as one of the fixed disk type;

b) starting the computer system wherein the BIOS requests a master boot record from the removable media drive;

c) transferring a substitute master boot record from the removable media storage device to the BIOS in response to the request from the BIOS for a master boot record on sector 0 of the media;

d) transferring a supplemental boot program from the removable media device, wherein the supplemental boot program contains the code to modify the operating system to change the removable media drive from one of the fixed disk type to one of the floppy disk type and contains the code to modify the operating system to support the removable media drive;

e) loading an operating system;

f) monitoring the operating system load sequence for a read of the operating system containing a predefined set of instructions;

g) modifying the operating system to change the removable media drive from one of the fixed disk type to one of the floppy disk type;

h) modifying the operating system to support the removable media drive; and, i) completing the boot sequence according to a conventional boot sequence.

11. The method according to claim 10, wherein the step (e) comprises the steps of loading the operating system from one of the removable media drive and another fixed disk drive.

12. The method according to claims 10, wherein the computer system further comprises a first floppy disk, wherein the step (g) comprises the further steps of changing the first floppy disk drive assignment within the operating system from the first floppy drive to the second floppy drive and changing the removable media drive assignment within the operating system to the first floppy drive.

13. The method according to claims 10, wherein the computer system further comprises a fixed disk drive configured as a second fixed disk drive, and wherein the step (g) comprises the further steps of changing the fixed disk drive assignment within the operating system from the second disk drive to the first disk drive.

14. The method according to claim 10, wherein the supplemental boot program is stored on at least one of the removable media and a memory device within the removable media drive.

15. The method according to claim 14, wherein the supplemental boot program is transferred from the removable media to the processor when the removable media is present.

16. The method according to claim 14, wherein the supplemental boot program is transferred from the memory device to the processor when the removable media is not present.

17. The method according to claim 14, wherein the supplemental boot program stored on the removable media is stored on sectors in the range of 1 and 32.

18. The method according to claim 14, wherein the memory device comprises a Read-Only Memory device.

* * * * *